March 16, 1965   W. A. STOCKS   3,173,675
GUTTER JOINT CLAMP
Filed March 10, 1961   2 Sheets-Sheet 1
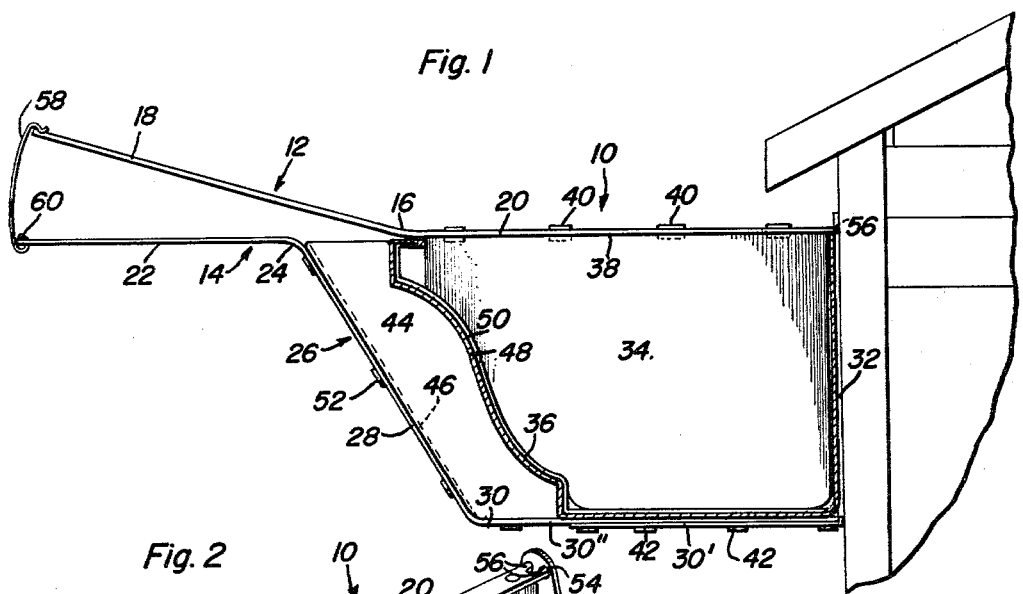
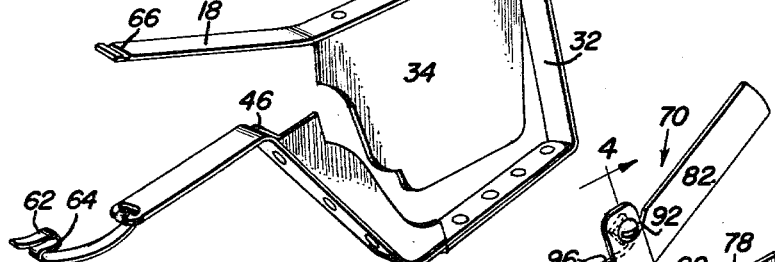
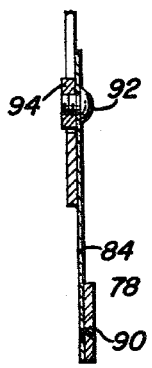
William A. Stocks
INVENTOR.

March 16, 1965  W. A. STOCKS  3,173,675
GUTTER JOINT CLAMP
Filed March 10, 1961  2 Sheets-Sheet 2
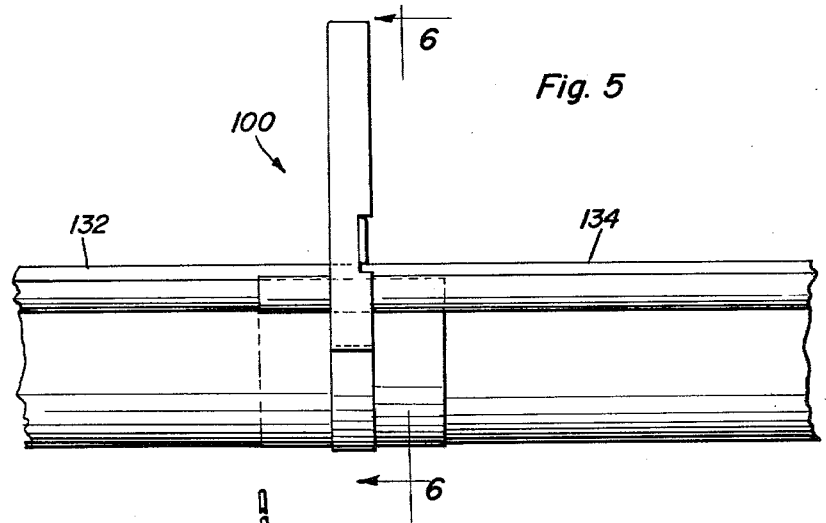
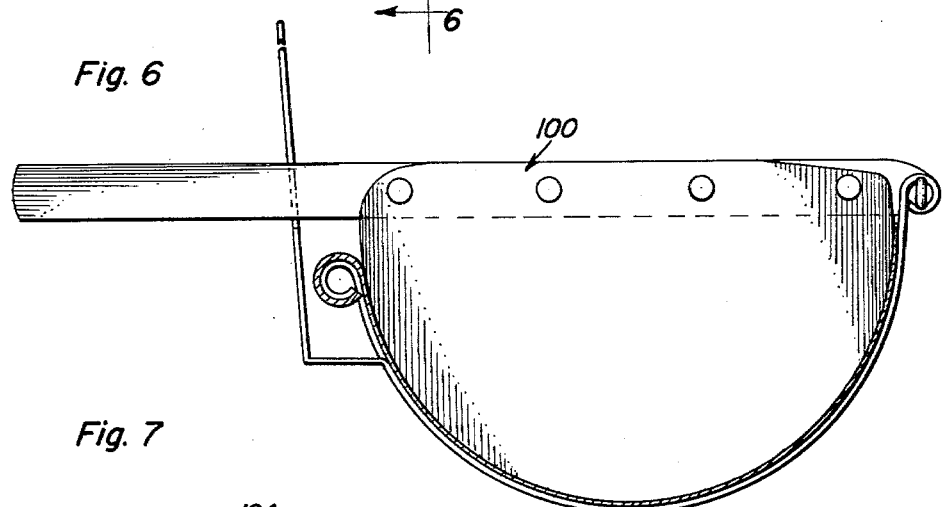
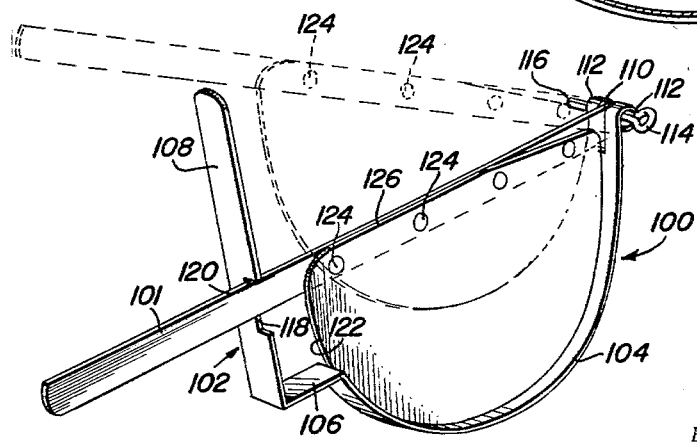
William A. Stocks
INVENTOR.

United States Patent Office 3,173,675
Patented Mar. 16, 1965

3,173,675
GUTTER JOINT CLAMP
William A. Stocks, 3912 Bowden Ferry Road,
Norfolk, Va.
Filed Mar. 10, 1961, Ser. No. 94,807
2 Claims. (Cl. 269—239)

This invention relates to clamping devices, and more particularly to devices for clamping the overlapping ends of gutters whereby they may be more easily and efficiently soldered.

Briefly, the invention comprises a clamping device composed of two handle members pivoted together at adjacent ends. One handle member has a portion shaped like the cross-section of a gutter so as to fit under the gutter and support the same. The other handle has a portion shaped to fit the inside of the gutter and mate with the first mentioned portion adapted to fit beneath and on the outside of the gutter. When the free ends of the handles are forced together by their connecting pivot points, the two mating portions are also forced together so as to clamp the ends of two overlapping gutter sections and tightly force the entire surfaces of these end portions into contact with one another whereby they may be easily and effectively soldered.

Accordingly, it is a primary object of this invention to provide a clamping tool adapted to clamp the overlapping ends of guttering into tight engagment with one another whereby they may be easily and effectively joined together by conventional means such as soldering.

Another object of the invention is to provide a clamping device for guttering so designed that it may be effectively and efficiently operated by only one hand of the operator whereby he may use the other hand for other purposes such as supporting the guttering or operating the device for joining the guttering.

It is another object of my invention to provide a device for clamping the ends of guttering which is relatively simple in design and therefore economical to manufacture and maintain.

It is still another object of my invention to provide a clamping device for guttering which permits the ends of the guttering to be connected together in actual construction work more simply and more quickly than by conventional methods.

It is still another object of my invention to provide a device for semi-automatically clamping the ends of guttering together instantaneously and thereby eliminating the time consuming conventional method of clamping guttering together by means of setscrews.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of my invention showing it in operative position on two pieces of overlapping guttering;

FIGURE 2 is a perspective view of my invention drawn to a smaller scale;

FIGURE 3 is a perspective view of a modfication of my clamping device showing it installed on the overlapping ends of two pieces of guttering;

FIGURE 4 is an enlarged cross sectional view taken substantially on the plane of line 4—4 of FIGURE 3;

FIGURE 5 is an end elevational view of a second modification of my invention;

FIGURE 6 is an enlarged cross sectional view taken substantially on the plane of line 6—6 of FIGURE 5; and FIGURE 7 is a perspective view on a smaller scale showing the modification illustrated in FIGURES 5 and 6.

As illustrated in the drawings, a preferred form of a gutter clamp assembly 10 is illustrated in FIGURES 1 and 2. The assembly 10 comprises two handle assemblies 12 and 14, the former comprising a flat elongated member angled slightly at 16 and comprising a handle portion 18 and a die support member 20.

The handle assembly 14 comprises a handle 22 bent downwardly at 24 to form a substantially U-shaped die support 26 having the three wall portions 28, 30 and 32.

A female die 34 has its lower and side surfaces configurated or shaped to mate with and fit flush with the inside surfaces of a gutter member 36. The upper end of the female die has an integral 90° flange 38 of approximately the same width as the die support 20 and lies flush thereagainst and in alignment therewith. The female die 34 is rigidly connected to the die support 20 by the rivets 40 which extend through aligned apertures in the flange 38 and the die support 20.

The U-shaped die support 26 has its bottom leg 30 composed of two overlapping members 30' and 30" rigidly fixed together by means of rivets 42 whose upper ends are countersunk within tapered bores in the member 30" so as to form a smooth upper surface thereon.

A male die member 44 has its inner edge 48 contoured to fit snugly against the outer surface of a guttering member 50. The male die 44 is also flanged at 46. Flange 46 is riveted in alignment with the leg member 28 by rivets 52 which extend through aligned apertures in the member 28 and the flange 46.

The upper end of the leg 32 has two side-by-side bores 54 formed therein for receiving the parallel projections 56 on the end of the die support 20. The projections fit loosely within the bores 54 so that the assembly 12 may be freely pivoted towards and from the assembly 14.

A clamp 58 composed of a flat strip of spring steel is pivotally connected by a loop 60 formed at its lower end pivotally connected to the handle 22. The loop portion 60 extends through an oblong bore formed in the end of the handle 22. The upper end of the clip has a U-shaped portion 62 formed integrally therewith having a downwardly extending clamping surface 64 for engaging an arcuate transverse groove 66 formed in the free end of the handle 18.

In the modification shown in FIGURES 3 and 4, the clamping device 70 comprises two substantially L-shaped levers 72 and 74 pivotally connected together in the vicinity of their apexes by threaded bolt 76 which extends through apertures in the levers 72 and 74 and has a nut and lock nut threaded on its opposite side, not shown, for holding the levers together and yet permitting them to pivot relative to one another on the shank of the bolt 76.

The lever 72 comprises a handle member 78 integrally connected at one end to a female die member 80 for mating with the inner surface of the inner guttering member 130. The handle 72 forms an angle with the die member 80 of approximately 110°.

The lever 74 comprises a handle 82 integrally connected at its lower end to a male die member 84 which fits flush against and mates with the outside of the outer guttering member 86.

The handle member 82 extends upwardly and away from the handle member 78 so as to form an angle of approximately 40° therewith.

The handle 78 has a flat leaf spring 88 rigidly attached thereto by rivets 90. Spring 88 extends upwardly from the handle 78 and has an aperture at its upper end receiving a screw 92 having a square nut 94 threaded thereon so as to tightly compress the spring between the nut and the head of the screw as shown in FIGURE 4. The upper surface of the handle 82 has an arcuate groove 96 formed therein for receiving the nut 94 when the handles 78 and 82 are forced tightly together for compressing two overlapping guttering ends tightly together such as illustrated at 83 and 86. As the handles 78 and 82 move together, the leaf spring 88 presses the square nut 94 against the side of the handle 82 when the guttering is tightly clamped together, the spring snaps the nut 94 into groove 96 for locking the levers in the clamping position illustrated.

In the second modification illustrated in FIGURES 5 through 7 inclusive, the clamping device 100 is particularly designed for clamping the guttering together which is arcuate in cross section. The device 100 comprises a substantially straight lever 101 pivoted to an end of the lever 102.

The lever 102 comprises an arcuate female die portion 104 connected by a flange 106 to a handle 108 which is substantially perpendicular to the lever 101 when in the clamping position. The free end of the female die portion 104 is slotted at 110 for receiving the pivoted end of the lever 101. The free end of the die portion 104 is bent into two loops 112 which are aligned with an aperture in the free end of the lever 101. The loops and the aperture receive a cotter pin 114 for pivotally connecting the two levers together. The portions comprising the end 116 of the cotter pin 114 may be spread apart for preventing removal of the cotter pin while in use.

One side edge of the handle 108 has a rectangular recess 118 slightly larger than the cross-section of the lever 101 for receiving the lever as shown in FIGURE 7. When the lever is urged downwardly as shown in FIGURES 5 through 7 into its operative clamping position, the recess 118 receives the lever 101 and the upper edge of the recess 118 comprises an abutment 120 for engaging the upper surface of the lever 101 and holding in its operative clamping position.

The handle 101 has secured thereto by means of rivets 124 a substantially semi-circular male die member 122 whose lower arcuate surface is of substantially the same size and shape as the female die portion 104. The upper edge 126 of the male die member is substantially flush with the upper surface of the lever 101. Lever 101 is resiliently urged into slot 118.

In operating the form of the invention as shown in FIGURES 1 and 2, the end of the piece of guttering 36 is inserted a small distance such as an inch or two within the end of the guttering member 50. The U-shaped die support 26 is then separated from the handle assembly 12 and then inserted under the overlapping end of the gutter member 58 and pushed upwardly until it fits snugly around the lower surface of the guttering member as shown in FIGURE 1. The handle assembly 12 is then tilted downwardly as shown in FIGURE 2 and the projections 56 at its lower end are inserted into the bores 54 on the upper end of the leg 52. The handle 18 is then pushed downwardly so as to pivot the assembly 12 about its projections 56. The handle 18 is pushed downwardly as far as it will go until the overlapping ends of the guttering members 36 and 50 are tightly clamped together as shown in FIGURE 1, and then the clip 58 is pivoted in a clockwise direction as viewed in FIGURE 1 about the loop 60 until the arcuate surface 64 snaps within the groove 66 for locking the handles 18 and 22 together and the guttering members 50 and 36 into tight engagement with each other as shown in FIGURE 1. With the ends of the guttering locked in this position, the guttering may be easily soldered at each extreme end of the overlapping portions.

Without the clamp 12, the ends of the guttering would not normally lie flat against the adjacent piece of guttering which it overlaps due to the resiliency of the guttering, errors in manufacturing, misalignment of the guttering, damage to the guttering during installation, etc.

The form shown in FIGURES 3 and 4 is operated in substantially the same manner as the clamp 12 shown in FIGURES 1 and 2. As shown in FIGURE 3, the guttering members 86 and 130 are overlapped so that their ends 83 and 128 are spaced from one another. The handles 82 and 78 are then separated by pivoting them about the studs 76 so as to separate the die members 80 and 84. When the handles 78 and 82 are forced together so as to pivot about the stud 76, the female die member 80 and the male die member 84 pivot together so as to tightly clamp the edge of the overlapping portions of the guttering members 86 and 130 tightly together whereby they may be easily soldered. As the handles 78 and 82 are pressed together, the spring 88 snaps the nut 94 into the groove 96 when the guttering members are tightly pressed together. The nut 94 acting against the upper surface of the groove 96 acts as a lock for holding the guttering members in their clamped position. To separate the handle 78 and 82, it is only necessary to flex the upper end of the spring 88 laterally for disengaging the nut 84 from the groove 96.

The modification shown in FIGURES 5 through 7 operates in a similar manner as the first two forms. However, in this form the clamp 100 is inserted in an open position over the overlapping ends of the guttering members 132 and 134 and the lever 101 is pivoted downwardly in relation to the handle 108 until it snaps into the recess 188 for locking the guttering members into tight overlapping position. Engagement of the handle 101 with the abutment 120 of the recess 118 acts to lock the lever 101 in its clamping position for permitting the overlapping ends of the guttering 132 and 134 to be soldered or connected together.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gutter clamp comprising a first lever assembly and a second lever assembly, said first assembly comprising a first elongated member having a first handle means at one end and a male die means at its other end, said second assembly comprising a second elongated member having a second handle means at one end and a female die means at its other end, said male and female die means complementing each other and conforming to the configuration of a guter to be clamped thereby, said elongated members being connected together by pivot means for enabling a closing and opening pivotal movement of the die means toward and away from each other, said male die means in the closed position of the clamp being nested within the female die means with only sufficient space therebetween so as to firmly clamp nested gutter sections of the aforementioned configuration together, both said handle means being orientated for movement in substantially the same plane, one of said handle means being flexed slightly laterally of said plane and slidably engaged with the other of said handle means at a point spaced from the die means so as to both guide the lever assemblies and stabilize the lever assemblies during the closing or clamping movement thereof, and means for automatically locking said handle means together against opening pivotal movement upon a closing of the clamp with the die means in the aforementioned nested relation, said elongated members having flat side faces and being of a width substantially greater than the thickness, said first elongated member being orientated with its flat side face perpendicular to the flat side face of the second elongated member, said pivot means securing the extreme male die end of the first member to the extreme female die end of the other member at approximately the longitudinal center thereof, said male die means extending toward said second member in a plane parallel to the plane of the first member and terminating at approximately the longitudinal centerline of the second member, said second elongated member being formed so as to conform to the shape of the extended portion of the male die means, thus forming the female die means, said locking means consisting of a notch in the edge of the second handle means, said first handle means being slidably engaged with this notched edge upon a lateral flexing thereof, said notch being spaced a substantial distance from the free end of said second handle means so as to provide sufficient room for grasping the second handle means outward of the notch, said notch being located so as to enable an unflexing of the first handle means upon the clamp being closed, said notch being of a size so as to lock the first handle means therein against further pivotal movement relative to the second handle means.

2. The device of claim 1 wherein said handle means are orientated at approximately right angles to each other.

References Cited in the file of this patent

UNITED STATES PATENTS

| | | |
|---|---|---|
| 449,107 | Colsten | Mar. 31, 1891 |
| 832,317 | Hinds | Oct. 2, 1906 |
| 1,094,536 | Davis | Apr. 28, 1914 |
| 1,119,419 | Frakes | Dec. 1, 1914 |
| 1,440,196 | Willison | Dec. 26, 1922 |
| 1,924,799 | Moore | Aug. 29, 1933 |
| 2,216,073 | Farrall et al. | Sept. 24, 1940 |
| 2,532,141 | Barkan et al. | Nov. 28, 1950 |
| 2,945,463 | Knucklinsky et al. | July 19, 1960 |

FOREIGN PATENTS

| | | |
|---|---|---|
| 179,273 | Australia | Aug. 10, 1954 |
| 19,556 | France | Dec. 15, 1914 |
| 593,756 | France | June 6, 1925 |